United States Patent
Surridge et al.

(10) Patent No.: US 10,252,449 B1
(45) Date of Patent: Apr. 9, 2019

(54) ROTATIONAL MOLDING WITH PRE-FORMED SHAPES

(71) Applicant: Centro, Inc., North Liberty, IA (US)

(72) Inventors: David G. Surridge, Hickory, NC (US); Daniel D. Grimes, North Liberty, IA (US)

(73) Assignee: Centro, Inc., North Liberty, IA (US)

( * ) Notice: Subject to any disclaimer, the term of this patent is extended or adjusted under 35 U.S.C. 154(b) by 405 days.

(21) Appl. No.: 15/001,779

(22) Filed: Jan. 20, 2016

Related U.S. Application Data

(60) Provisional application No. 62/107,130, filed on Jan. 23, 2015.

(51) Int. Cl.
| | | |
|---|---|---|
| *B29C 41/04* | (2006.01) | |
| *B29C 69/02* | (2006.01) | |
| *B29C 35/02* | (2006.01) | |
| *B29C 67/00* | (2017.01) | |
| *B29C 69/00* | (2006.01) | |

(Continued)

(52) U.S. Cl.
CPC .............. *B29C 41/04* (2013.01); *B29C 35/02* (2013.01); *B29C 41/20* (2013.01); *B29C 67/00* (2013.01); *B29C 69/001* (2013.01); *B29C 69/02* (2013.01); *F17C 3/00* (2013.01); *B29K 2023/06* (2013.01); *B29K 2077/00* (2013.01); *B29K 2101/12* (2013.01); *B29K 2105/253* (2013.01); *B29L 2022/00* (2013.01); *B29L 2031/7172* (2013.01)

(58) Field of Classification Search
CPC ......... B29C 41/04; B29C 69/02; B29C 35/02; B29C 67/00; B29C 69/001; B29C 41/20; F17C 3/00; B29K 2023/06; B29K 2077/00; B29K 2101/12; B29K 2105/253; B29L 2022/00; B29L 2031/7172
See application file for complete search history.

(56) References Cited

U.S. PATENT DOCUMENTS

| | | | |
|---|---|---|---|
| 3,219,566 A | 11/1965 | Potts et al. | |
| 3,296,189 A | 1/1967 | Eastman | |

(Continued)

FOREIGN PATENT DOCUMENTS

| | | |
|---|---|---|
| JP | 2006123532 A | 5/2006 |
| WO | WO2008074006 A1 | 6/2008 |

OTHER PUBLICATIONS

Paxon (TM) 7000 Series High Density Polyethylene Resign Datasheet, ExxonMobile, 2009, 222.exxonmobilepe.com.

(Continued)

*Primary Examiner* — Michael C Miggins
(74) *Attorney, Agent, or Firm* — Shuttleworth & Ingersoll, PLC; Jason Sytsma

(57) ABSTRACT

A method of incorporating a preformed shape into a rotational molded product by a method that comprises the steps of a) forming a first resin into an uncured preformed shape having perimeter edges; b) positioning the uncured preformed shape having perimeter edges against an inside wall of a rotational mold; c) adding a second resin into the rotational mold; heating and rotating the rotational mold to form the rotational molded product, wherein said second resin binds to the perimeter edges of the preformed shape and the preformed shape becomes cured. The invention also relates to a rotationally molded product that has a preformed shape made of a first resin incorporated into an object or vessel made of a second resin, wherein the preformed shape is integral with the object or vessel.

25 Claims, 10 Drawing Sheets

(51) Int. Cl.

| | |
|---|---|
| *B29C 41/20* | (2006.01) |
| *F17C 3/00* | (2006.01) |
| *B29K 77/00* | (2006.01) |
| *B29K 101/12* | (2006.01) |
| *B29K 105/00* | (2006.01) |
| *B29L 22/00* | (2006.01) |
| *B29L 31/00* | (2006.01) |

(56) References Cited

U.S. PATENT DOCUMENTS

| | | | |
|---|---|---|---|
| 3,627,728 | A | 12/1971 | Fernandes et al. |
| 3,976,821 | A | 8/1976 | Carrow et al. |
| 4,419,408 | A | 12/1983 | Schmukler et al. |
| 4,477,532 | A | 10/1984 | Schmukler et al. |
| 4,548,779 | A | 10/1985 | Steinberg et al. |
| 4,678,577 | A | 7/1987 | Thomas et al. |
| 4,973,438 | A | 11/1990 | Gaudreau |
| 5,071,686 | A | 12/1991 | Genske et al. |
| 5,128,409 | A | 7/1992 | Gaggar |
| 5,833,913 | A | 11/1998 | Ellwood et al. |
| 6,099,924 | A | 8/2000 | Nakamaki et al. |
| 6,126,315 | A | 10/2000 | Ichikawa et al. |
| 6,410,141 | B1 | 6/2002 | Grimmer |
| 6,599,639 | B2 | 7/2003 | Dayrit et al. |
| 6,946,176 | B2 | 9/2005 | Jousse et al. |
| 6,982,057 | B2 | 1/2006 | King et al. |
| 7,247,268 | B2 | 7/2007 | Jousse et al. |
| 7,923,121 | B2 | 4/2011 | Jackson et al. |
| 8,597,747 | B2 | 12/2013 | Spence et al. |
| 8,721,951 | B2 | 5/2014 | Spence et al. |
| 8,911,842 | B2 | 12/2014 | Spence et al. |
| 2001/0054779 | A1 | 12/2001 | Collette et al. |
| 2003/0161981 | A1 | 8/2003 | Jousse et al. |
| 2004/0053054 | A1 | 3/2004 | Bobovitch et al. |
| 2006/0083875 | A1 | 4/2006 | Weaver |
| 2006/0147664 | A1 | 7/2006 | Richards et al. |
| 2006/0211804 | A1 | 9/2006 | Kim et al. |

OTHER PUBLICATIONS

Organic Peroxides-Crosslinking rubber, elastomer and polyethylene brochures, p. 13, 2009, Arkema, Inc., www.arkema-inc.com/crosslinking.com.
Flory, Fu,Linn, Cogen & Bolz, "Adhesion of Crosslinked Polymer Insulation to Copper and Tinned Copper Conductors", International Wire & Cable Symposium, Proceedings of the 58th IWCS/IICIT, Piscataway, New Jersey.
Tamboli, et al., Crosslinked Polyethylene, Indian Journal of Chemical Technology, Nov. 2004, vol. ii, Mumbai, India.
Sabic Innovative Plastics, Weathering a Practical Approach.
EVAL; EVOH Barrier Resins, Belgium, Sep. 19, 2012.
Alvarado, Peter J., Steel vs. Plastics: The Competition for Light-Vehicle Fuel Tanks, JOM 48(7), 1996, pp. 22-25.
Rotational Molding Resins, PolyProcessing Technical Bulletin #T-0009, Oct. 1999.
Portion of Rotational Molding article, Marcel Dekker, Inc. Copyright 2000 (best available copy).
Quote from Tool and Manufacturing Engineers Handbook, Circa 1998 (best available copy).
Persico to Introduce New Plastic Rotomoulding Technology at the Plast'06 Exhibition 2006 Milan.
O'Brien, Gregory, New Rotomoulding Products & Processes for Lower Permeation Fuel Tanks, Atofina, 2004.
Cleveland 2004 ARM International 29th Annual Fall Conference, Cleveland, Ohio, Oct. 2004.
Association of Rotational Molders Member News for 2006, Association of Rotational Molders International, Glen Ellyn, Illinois.
Definition of "tank", Merriam-Webster Dictionary, 2010.
Brandrup, Immergut, Grulke et al., Melting Temperature of Linear Polyethylene; Polymer Handbook, Fourth Edition; V/14; 1999.
Clark, Crisi, "How to Create Flanges, Tabs, and Inserts for Plastics", Mold in Graphic Systems, Clarkdale, Arizona, 2015.
Crawford, Spence, Cramez, and Oliveira, "Mold Pressure Control as a Tool in Rotational Molding", The University of Aukland, New Zealand, Centro, Inc. USA, Universidade do Minho, Portugal, Association of Rotational Molders, 2000.
Yarmoska, Joesten—Mobile Chemical Company, "How Does Part Performance Depend on Molding conditions?", The Association of Rotation Molders 1998 Fall Meeting.
Beal, Glenn L., Rotational Molding Design, Materials, Tooling and Processing, p. 236, Carl Hanser Verlag, Munich 1998.
Crawford, R.J., Nugent, P.J., Improve Quality and Reduce Cycle Times Through Better Process Control, The Queen's University of Belfast—*Date unknown but prior to U.S. Filing Data.*

ROTATIONAL MOLDING WITH PRE-FORMED SHAPES

The present invention claims priority from provisional patent application Ser. No. 62/107,130 filed Jan. 23, 2015. The disclosure of provisional patent application Ser. No. 62/107,130 is hereby incorporated in its entirety.

BACKGROUND OF THE INVENTION

1. Field of the Invention

The invention relates to the field of rotational molding.

2. Brief Description of Related Art

Rotational molding, also known as rotomolding, is a process whereby a plastic resin is heated in a slowly rotating hollow mold to evenly distribute the plastic resin over the interior surface of the mold. Molded products of varying size and shape can be manufactured using this process. Manufacturing large, hollow parts such as oil tanks are much easier by rotational molding than any other method. Components can be manufactured with little to no draft and can be made with various types of metal inserts and varying color and textures.

The process has numerous advantages, including the ability to create large, complex shapes with low internal stresses. Rotational molds are generally less expensive than other types of molds. Very little material is wasted using this process and excess material can often be re-used. This makes it a very economically and environmentally viable manufacturing process. Tooling costs are among the lowest of options for the manufacture of plastic parts helping to make rotational molding an economical choice for low production runs.

Rotational molding is often employed for the manufacture of various types of containers including fuel tanks. However, there are very few options for producing transparent or translucent sight windows in an otherwise opaque vessel or tank. The process is also limited in it's ability to produce detailed features, solid features such as mounting tabs, various molded openings or multicolored products.

SUMMARY OF THE INVENTION

The invention relates to vessels, other rotational objects or components with a sight window incorporated therein. The invention also relates to a vessel or other rotational molded component that has incorporated therein preformed shapes such as solid mounting tabs similar to those used in blow molding, small detailed features, various types of solid features, a preformed hole, colored indicia, preformed threads or any of a variety of challenging details.

The invention also relates to a method of making a tank or other vessel by rotational molding wherein a separate preformed shape is incorporated into the tank or vessel during the molding process. The preformed shape may be a sight window or other physical feature as described above.

DETAILED DESCRIPTION

Figure 1:
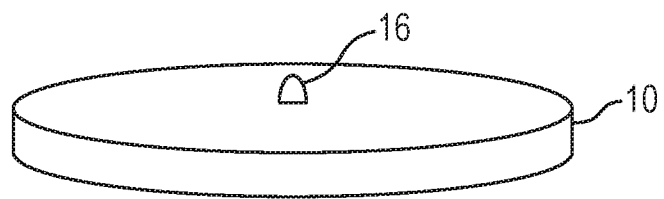
FIG. 1 is a perspective view of a preformed shape.

Definitions:

Preformed Shape: A preformed shape is any object that is premade by the method of the invention prior to the rotational molding process of a product. The preformed shape is made with a first resin.

Uncured preformed shape: Uncured preformed shape refers to an object made from a rotational mold resin that has been heated and/or pressure treated in its forming process without curing the resin. For a crosslinkable rotational molding resin, this means that the process by which the preformed shape was made did not result in the crosslinking of the resin and the preformed shape is still stable and sturdy. For a linear resin, this means that the process by which the preformed shape was made did not fully sinter the plastic to be bubble free.

Cured: Cured or curing are terms in polymer chemistry and process engineering that refers to the toughening or hardening of a polymer material, the surface becomes smooth and the melt density rises. For crosslinkable polymer resins, curing happens by cross-linking of polymer chains and removal or dissolution of gas bubbles. For linear polymer resins, curing happens when the majority of the gas bubbles are removed and/or dissolved.

Uncured: Uncured refers to the first resin being heat and/or pressure treated up to a point where crosslinking does not occur in the case of a crosslinkable first resin and in the case of a linear resin, where there are still bubbles remaining in the first resin.

Rotational molding resins: Rotational molding resin is any resin that is known in the art to be capable of being made into or incorporated into a rotationally molded product. Other resins that are suitable are resins that have antioxidant additives to withstand the long heat cycle typical of the rotational molding process.

Sintering: Sintering is the process of forming an article from fusible powders, the process of holding powder at a temperature just below its melting point for a period of time. The particles are fused (sintered), but the mass, as a whole, does not melt. Sintering results in uncured first resin. The atoms in the materials diffuse across the boundaries of the particles, fusing the particles together and creating one solid piece. Sintering is chosen as a shaping process for the preformed shape for a number of reasons including it's ability to create the shape without the need for additional materials (adhesives, binders, etc.) which might affect the material properties of the final product.

Rotational molding: Rotational molding, also called rotomolding or rotocast, is a thermoplastic process for producing hollow parts by placing powder or liquid resin into a hollow mold and then rotating the mold bi-axially in an oven (or by other heating method) until the resin melts and coats the inside of the mold cavity. The rotational molding process is a low-pressure plastic-forming process that uses heat and biaxial rotation (i.e., angular rotation on two axes) to produce hollow, one-piece parts.

Rotational molding machine: Rotational molding machines are made in a wide range of sizes. They normally consist of molds, an oven, a cooling chamber, and mold spindles. The spindles are mounted on a rotating axis, which provides a uniform coating of the plastic inside each mold. Molds (or tooling) are generally either fabricated from welded sheet steel or cast. The fabrication method is often driven by part size and complexity; most intricate parts are likely made out of cast tooling. Molds are typically manufactured from stainless steel or aluminum. Aluminum molds are usually much thicker than an equivalent steel mold, as it is a softer metal. This thickness does not affect cycle times significantly since aluminum's thermal conductivity is many times greater than steel. Due to the need to develop a model prior to casting, cast molds tend to have additional costs associated with the manufacturing of the tooling, whereas fabricated steel or aluminum molds, particularly when used for less complex parts, are less expensive. However, some molds contain both aluminum and steel. This allows for variable thicknesses in the walls of the product. The aluminum addition to the steel provides more heat capacity, causing the melt-flow to stay in a fluid state for a longer period. In addition, new technologies have been and will continue to be developed which use alternative heating methods such as electrically heated molds or utilizing thermal fluid heating systems. These new technologies rely on the same principles of rotational molding and heat transfer but allow unique process control and efficiencies gains.

Materials and Methods:

The Rotational Molding Process:

The rotational molding process consists of four distinct phases:

1 Loading a measured quantity of polymer (usually in powder or pellet form) into the mold.
2 Heating the mold in an oven while it rotates, until all the polymer has adhered to the mold wall, melted and then cured or coalesced. The hollow part should be rotated through two or more axes, rotating at different speeds, in order to avoid the accumulation of polymer powder. The length of time the mold spends in the oven is critical: too long and the polymer will degrade, affecting material characteristics. If the mold spends too little time in the oven, the polymer melt may be incomplete. The polymer grains will not have time to fully melt and coalesce on the mold wall, resulting in large bubbles in the polymer. This has an adverse effect on the mechanical properties of the finished product.
3 Cooling the mold, using forced air and, if necessary, occasional water spray. The cooling of the mold and plastic part should be controlled in a way that allows even cooling across the surface in order to minimize warpage.
4 Removal of the part.

Making of a Preformed Shape:

The preformed shape of the invention can be any number of desired objects including a transparent sight window, a tab, mounting tab, object with preformed hole, shaped indicia, colored indicia, threads, small detailed feature, solid features, as well as localized special properties such as soft touch, paintability, polarized surface, scratch resistant, conductive, or other various properties or challenging details.

The preformed shape is made of a first resin. The first resin can be a variety of resins including but not limited to polymer resin, a linear polyethylene resin, a cross-linkable polyethylene resin, or any other resin with sufficient properties to be moldable in the rotational molding process. Examples of such first resins include ethylene vinyl acetate, thermoplastic elastomer, poly lactic acid, acrylic, vinyl, polyester compounds, nylon or composites of various rotationally moldable materials. The first resin can be in the form of a powder, micro-pellet, pellet, granulate, or other particulate, etc. The visual property of the first resin, when cured, can be opaque or translucent with varying degrees thereof. In the scenario when the preformed part is intended to be a sight window for a tank, it is preferred that the first resin be translucent when cured for better viewing of the contents of the tank.

The preformed shape is created in any number of sizes or shapes depending on the intended use. The preformed shape is created first and then incorporated into a rotomolded vessel or other object.

The preformed shape can be formed using pressure and minimal heat to form an object of primarily uncured polymer. Uncured means that the first resin has been treated and is in a range from minimally sintered resin to melted but uncured resin to form a primarily solid uncured object. Through this spectrum of forming the preformed shape, it is important that it is not completely cured but its shape is maintained. For a preformed shape made by either minimal sintering, extensive sintering or melting, the shape should be formed so that it's size and dimensions are maintained during transfer to a rotational mold. The preformed shape's size and dimensions must also be maintained while it is retained in the rotational mold. As long as there are sufficient antioxidants for further processing and as long as it has not been completely cured or crosslinked (crosslink activation point), it will serve the same purpose whether the preformed shape is sintered or melted. The preformed shape should be uncrosslinked and/or uncured until after the rotational molding step.

For linear PE, uncured relates to sintering or less than full bubble removal. For crosslinkable polyethylene, uncured relates to ensuring the peroxide has not been thermally activated so no crosslinking has occurred but the preformed shape is still stable and sturdy, whether melted or sintered Sintering:

In the case of sintering, the preformed shape is created by pressure sintering, heat sintering and/or laser sintering of the microparticles or pellets of the first resin. For example, the preformed shape may be formed with pressure and minimal heat to transform the nature of the resin from a powdered micro-pellet or pellet consistency to that of a molded shape by sintering the edges of the preformed shape without completely melting the internal resin.

Figure 2:
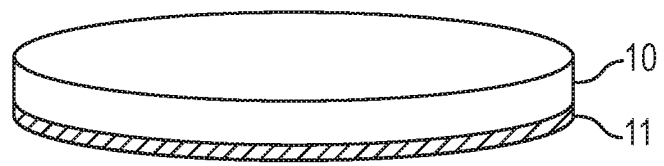
FIG. 2 is a perspective view of a preformed shape on a carrier.

Referring to FIG. 1, a preformed shape 10 may be created with or without a mounting tab 16 for mounting inside of the rotational mold. Referring to FIG. 2, the preformed shape 10 may be mounted on top of a carrier 11.

Figure 3:
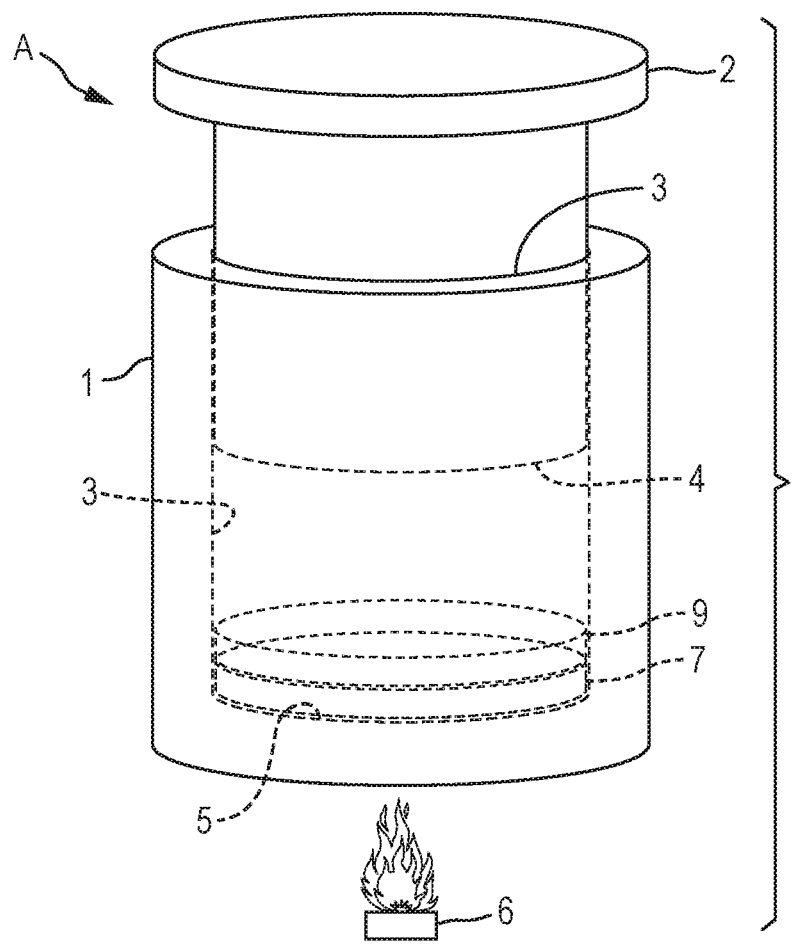
FIG. 3 is a perspective view of a sintering mold showing a preformed shape contained therein with a heat source.

FIG. 3 illustrates a pressure sintering process for creating a preformed shape. A sintering mold apparatus A is used. A first resin 9, in a predetermined amount, is loaded into a cavity 3 of a sintering mold main body 1. The first resin 9 sits on an ejection plate 7 for ease of removal later. In the case of a sight window preformed shape, a translucent first resin 9 is loaded into the mold cavity 3 and placed on the ejection plate 7 which sits over an upward facing surface 5 of the bottom of the main mold cavity 3. The core piece 2 is then inserted into the mold cavity 3. The bottom surface 4 of the core piece 2 is pressed downward onto the first resin 9. The sintering mold apparatus A is then heated with a heat source 6 to the appropriate temperature to sinter the first resin. Pressure may also be used. The mold and resin may also be preheated to a predetermined temperature appropriate for the selected type of resin. Heating can be by a variety of methods, including resistance heating, oil heating, infrared technology, etc. For sintering a preformed shape of compressed, mostly unmelted powder, the temperature of the first resin is kept below its melting point. The temperature depends on the resin in question as well as geometry, thickness, atmospheric pressure, etc. A predetermined amount of force is applied in the sintering mold by the core piece 2 to compress the first resin 9 into a desired preformed shape and thickness.

Depending on the object being formed and heat applied, the force may vary zero to 3,000 psi. Typical compression molding pressures range from 2,000-3,000 psi. This process would target pressure much lower than compression molding. The amount of force can be varied depending upon the geometry, resin, thickness, atmospheric pressure, etc. The sintering mold apparatus A is then cooled and a preformed shape is removed. Cooling should be to a temperature where the preformed shape can be handled without damage. Typically, this is around room temperature.

Figure 4:
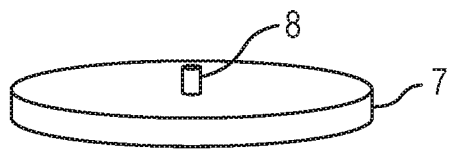
FIG. 4 is a perspective view of an ejection plate for use in use in a sintering mold.

FIG. 4 shows the ejection plate 7 in more detail having a stud 8 protruding from the center thereof. A stud is optional, however, when a stud is used in the ejection plate, a metal insert is threaded around the stud to assist with ejection and removal of the sintered object from the ejection plate.

The ejection plate permits easy removal of the preformed shape from the main body of the pressure sintering mold 1 (FIG. 3) after the first resin is sintered into the preformed shape. When the ejection plate does not have a stud, it can also be used as a carrier for the preformed object after sintering. The preformed shape would then be transported on the carrier to the rotational mold and put in place inside the rotational mold. The rotational mold may have a slot for receiving the carrier and holding it in place inside of the mold so that the inside facing surface of the carrier (the side that faces the center of the mold) is flush with the surface of the mold's metal surface. The thermal conductivity of the carrier metal relative to the thermal conductivity of the rotational mold metal should be chosen so that the first resin and the second resin melt at the same rates inside of the rotational mold. The curing of the preformed shape and the $2^{nd}$ resin should happen simultaneously and/or so the preformed shape is not overheated or thermally degraded in the process. This is especially important when the $1^{st}$ and $2^{nd}$ resins are polymers with different melt temperatures.

As a carrier, the ejection plate may also have some type of geometry or adhesive thereon to hold the preformed shape to the ejection plate.

The end result is a preformed shape 10 as shown in FIGS. 1 and 2 with a solid mass that has not been completely sintered and cured. In other words, there is still air between the particles. Although there may be some melting of resin particles at the boundary of the particles, melting does not occur through the interior of the particles when sintering. The melting of boundary particles only is not considered, for purposes of this invention, to be taking the first resin beyond its melting point. In this way, the preformed shape substantially retains the particulate nature of the resin particles within it.

Figure 5A:
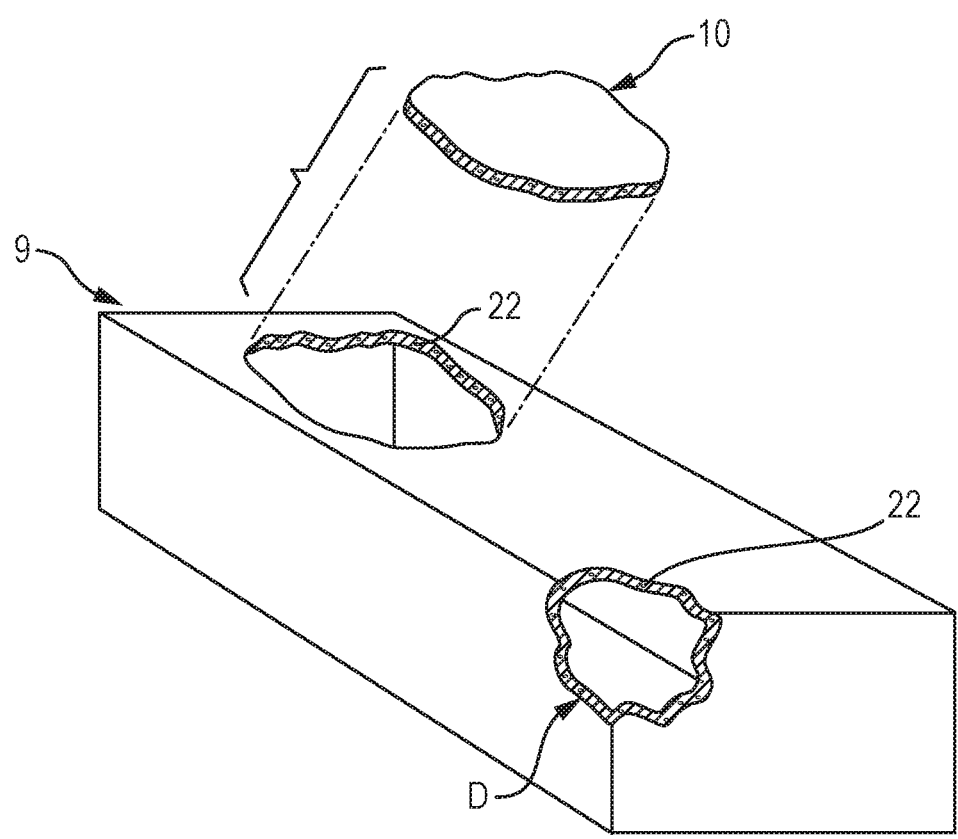
FIG. 5a is a perspective view of a preformed shape made from a rotationally molded first resin.
Figure 5B:
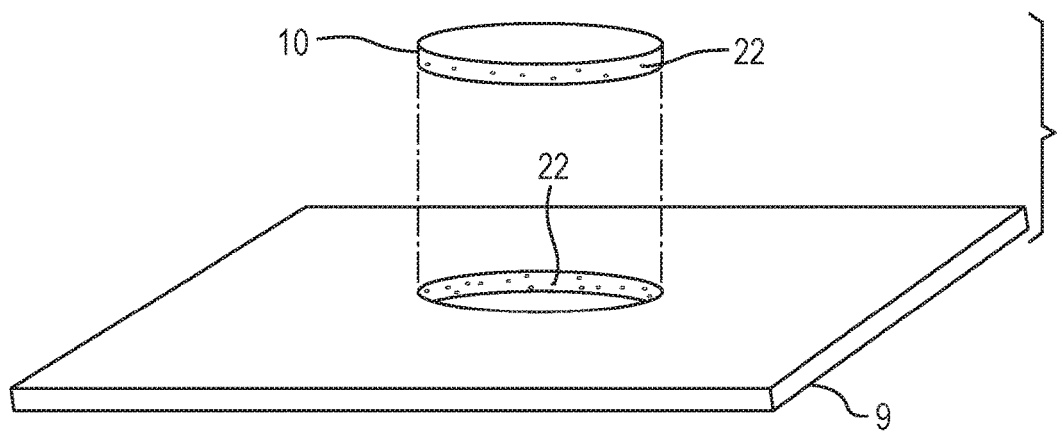
FIG. 5b is a perspective view of a preformed shape made from a traditional mold.

Melting:

Alternatively, in the case of melting, the first resin is melted into a preformed shape without curing the first resin. Sufficient heat and pressure is applied to melt the first resin to form the shape but not enough to completely cure the polymer or especially not enough to cause a crosslinking reaction to initiate. For crosslinkable resin, that means no crosslinking has occurred and for linear resin, bubbles will still be present. The optimal polymer temperature will vary depending upon the resin in question. Geometry, thickness, atmospheric pressure, etc. may also have an affect on temperature. As shown in FIG. 5a, the first resin can be melted but uncured into a solid mass 9 by rotationally molding the first resin. It is then cooled and the preformed shape 10 may then be cut, milled or stamped from the solid mass. Rotational molding is an acceptable process to use for forming the solid mass but other processes may be used as well. As illustrated in FIG. 5a, a cross-section of a rotationally molded preformed shape is shown at D. Otherwise, as shown in FIG. 5b, the preformed shape may be made by melting in a mold without curing. Some bubbles 22 will remain in the case where the first resin 9 is a linear resin.

Sintering and Partial Melting:

As indicated above, there may be instances when the preformed shape may be formed in the range where the first resin is partially sintered and/or partially melted, as long as the first resin is uncured.

Making a Rotational Molded Product with a Preformed Shape Incorporated Therein:

A preformed shape can be seamlessly incorporated into a rotational molded product in the form of a vessel or other object.

Figure 6:
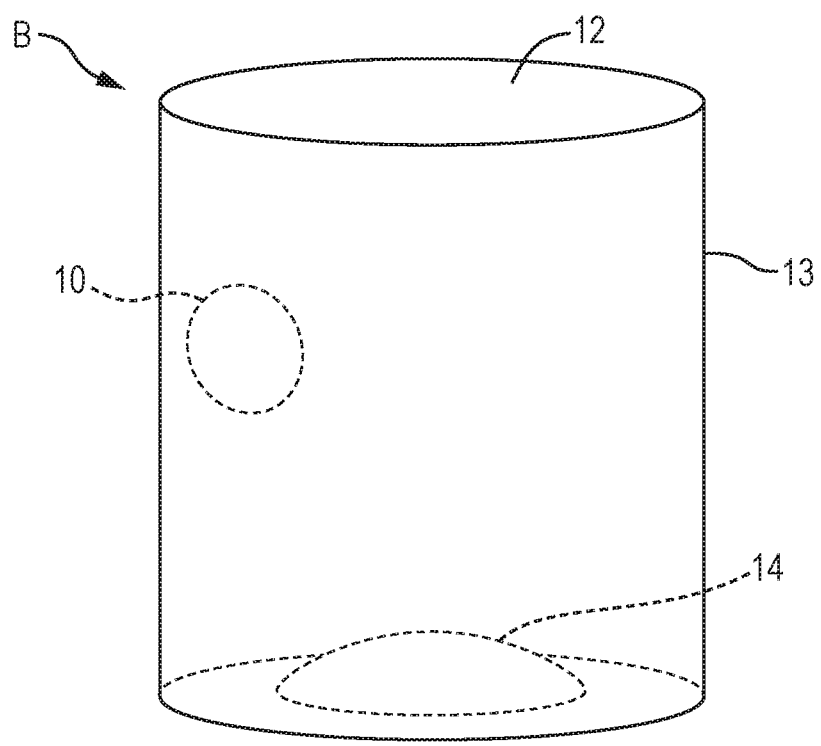
FIG. 6 is a mold for rotational molding showing a preformed shape positioned therein.

As shown in FIG. 6, a preformed shape 10 is loaded into an interior of a cavity and placed on an inside surface 12 of the rotational mold B in a predetermined position. It is retained on the inside surface of the mold 12. This can be done by any suitable manner for retaining the preformed shape in desired position in the rotational mold during the rotational molding process. The preformed shape can be placed anywhere in the mold. Examples of methods of retaining the position in the mold include features, such as tabs, clamps, magnets, metal inserts, threads, undercuts, adhesives, etc. on the preformed shape 10 or on the interior wall of the mold. In the case of using magnets to retain the preformed shape in the mold, ferrous metal would be incorporated into the first resin and magnets in the mold would keep it in place against the inside surface 12 of the mold wall 13.

Alternatively, the preformed shape 10 may be placed on a carrier 11 such as a metal plate (FIG. 2). In this embodiment, a plate carrier 11 covers the entire or significant portion of the surface of one side of the sintered preformed shape 10. During the sintering process of the preformed shape, the first resin is compressed against the metal plate carrier 11. The metal plate carrier is either attached against the inside of the rotational mold or placed in a slot to hold the preformed shape in place.

Once the preformed shape is in position, a second resin 14, that will make up the main body of the rotationally molded product/vessel (e.g. the body of a fuel tank, for example), is loaded into the rotational mold B (FIG. 6). The amount of the second resin charge is specifically calculated to the amount necessary to adhere and cover the exposed interior metal surface of the rotational mold.

In some applications the second resin type is identical to the first resin, meaning they are both crosslinkable or both noncrosslinkable. However, there may be applications where different types of first and second resins might be advantageous. Particularly to get an area of the molded object that is paintable, has adhesive characteristics, is abrasion resistant, is conductive, etc. This could either be just a localized outer layer with the $1^{st}$ resin and then the $2^{nd}$ resin coats the entire interior. Also in the case of the preformed shape being a sight window, its $1^{st}$ resin may have special properties besides just color. The $2^{nd}$ resin used for the molded object is unique in either color, resin type, resin properties, additives, etc.

In the case of a sight window where the opaque resin should not collect behind the translucent first resin of the preformed shape, the thickness of preformed shape is greater than the targeted thickness of the tank wall molded of the $2^{nd}$ resin. Whether the preformed shape is sintered or is a solid piece of uncured polymer, because the thermal conductivity of the preformed shape is lower than the bare metal interior surface of the rotational mold, the second resin is more attracted to the bare metal surface of the rotational mold than the preformed shape. The first resin contained in the preformed shape essentially insulates the mold wall. Since the thermal conductivity of the mold wall is higher than that of the preformed shape, the second resin will collect on the mold wall before it has the opportunity to collect on the preformed shape. The only "blending" of the first and second resins will occur where and as the preformed shape melts, starting at the mold wall. As the melt progresses through the preformed shape the second resin will blend and cure with it and/or crosslink. By the time the inner most surface of the preformed shape melts all of the second resin should have already collected on the mold wall, thus preventing the second resin from collecting behind the preformed shape. This is really only important in the case of a sight window where the opaque resin should not collect behind the translucent first resin of the preformed shape.

Figure 7A:
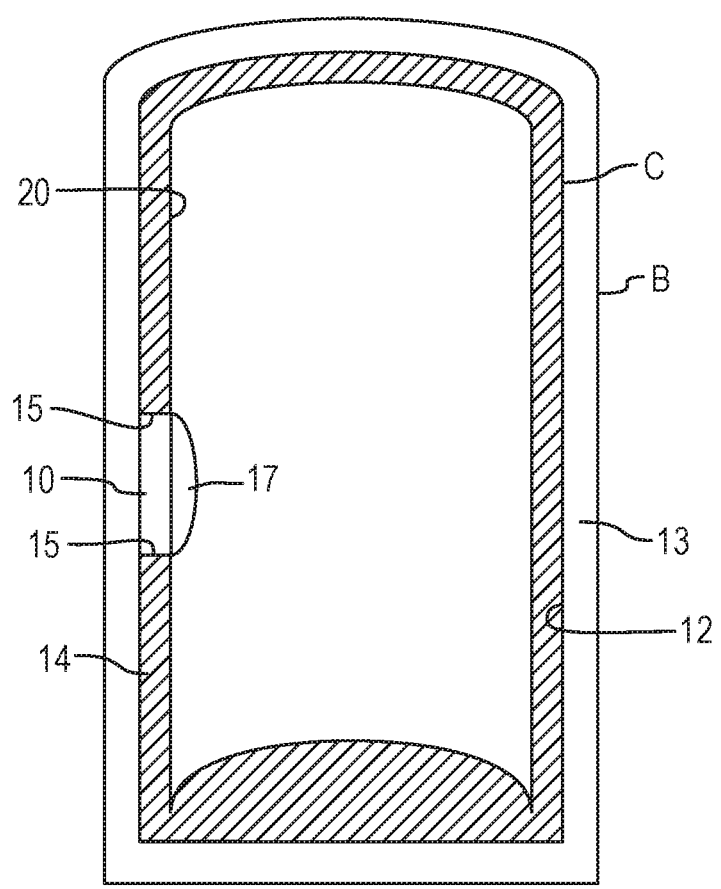
FIG. 7a is a cross section of a rotational mold with an object or vessel inside, wherein the object or vessel has a preformed shape incorporated therein.
Figure 7B:
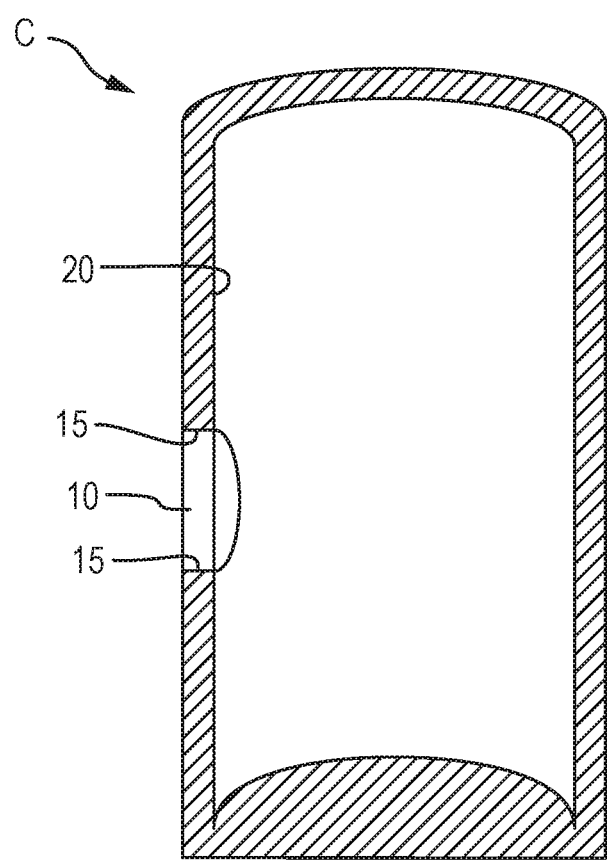
FIG. 7b is a cross section of an object or vessel made by rotational molding containing a preformed shape incorporated therein.
Figure 8:
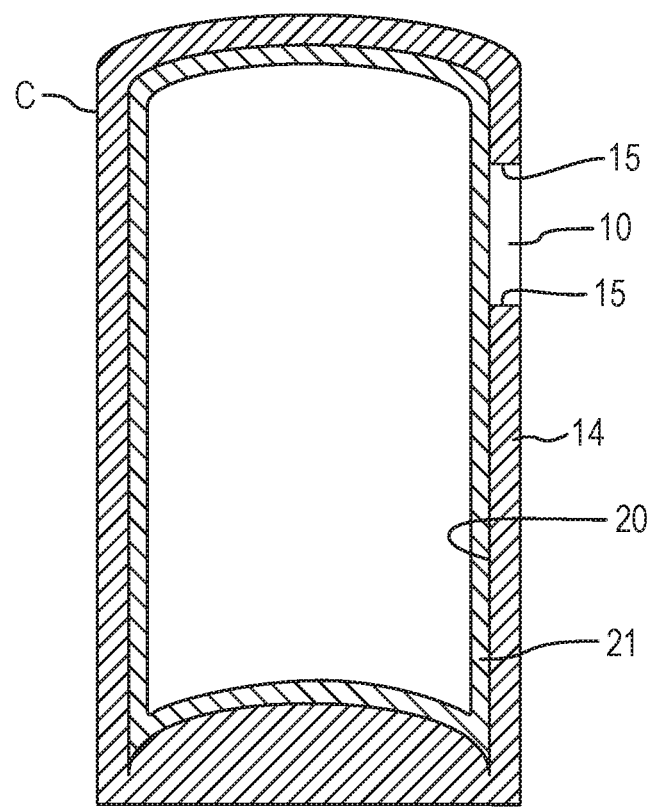
FIG. 8 is a cross section of an object of vessel made by rotational molding having multiple layers and containing a preformed shape incorporated therein.

The rotational mold is then heated and rotated so that the first resin 9 that has been made into a sintered preformed shape 10 and second resin 14 stick to the inside surface 12 of the rotational mold B as shown in FIG. 7*a*. Heating of the rotational mold can be by any number of methods. Since both the first resin of the preformed shape 10 and the second resin of the molded object C are polymers, having similar melting points in solid form and are introduced at similar temperature into the mold, the first resin in the preformed shape 10 melts along with the second resin 14 in the rotational molding process. Only the second resin builds up on the heated exposed metal surface of the rotational mold. The first resin and the second resin blend and bind together at the boundary 15 where the first resin and the second resin meet (FIGS. 7*a*, 7*b* and 8). This binding is around the perimeter of the preformed shape 10. The preformed shape melts from its outside perimeter toward its interior.

By the time the interior of the preformed shape 10 melts, the second resin 14 in the rotational mold B has already laid up on the exposed metal inside surface 12 of the rotational mold wall 13, thus preventing the interior surface 17 of the preformed shape 10 from becoming covered or coated by the second resin.

Figure 9:
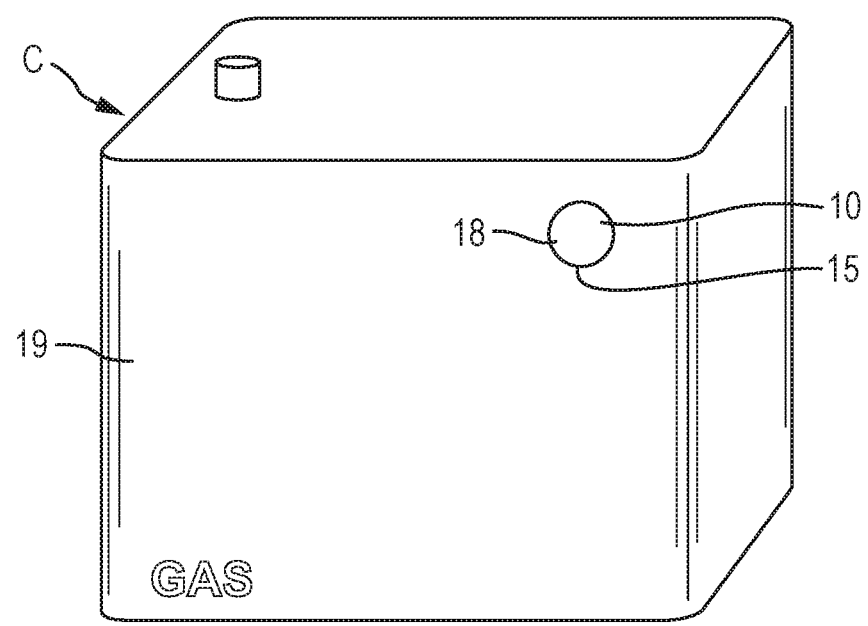
FIG. 9 is perspective view of a gas tank showing several preformed shapes incorporated into the side wall.

In the example of rotational molding a gas tank having a transparent window, the gas tank vessel C made with an opaque second resin includes a transparent sight window 18 (preformed shape) 10 made from a translucent first resin (FIG. 9). The sight window made from a preformed shape is integral with the gas tank sidewall 19 with no defects that would permit leaking of the gas outside of the tank. The exterior boundary edges 15 of the preformed shape sight window 10 are bound to the side wall 19 of the gas tank vessel C. FIG. 9 also shows other decorative indicia in the form of "Gas" for example, incorporated into the side wall of the gas tank vessel C. As stated earlier, preformed shapes can be made into any shape, color, size, transparency, etc. prior to being incorporated into a vessel or object.

Figure 10:
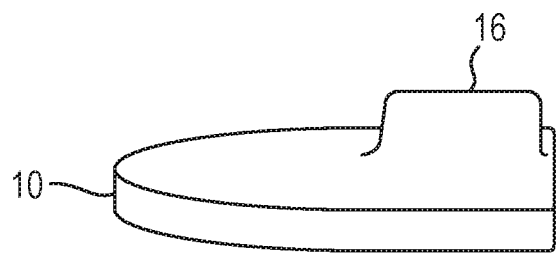
FIG. 10 is a perspective view of a preformed shape 10 showing a mounting tab 16.

It is also possible to incorporate different types of preformed shapes other than sight windows into a rotational molded object. FIG. 10 shows a preformed shape 10 with a mounting tab 16 incorporated therein. In an example of a solid mounting tab preformed shape, the thickness of the mounting tab is predetermined. The mounting tab preformed shape is loaded into the rotational mold and then by adjusting the amount of the second resin loaded into the rotational mold, the second resin may cover the interior surface of the preformed shape if desired. The need is based on the individual product requirements and molding requirements, etc.

The time of molding is chosen so that the first and second resins do not degrade but the melting of the resins is complete and the polymers coalesce on the mold wall.

After molding, the mold is cooled to solidify the polymer resin at which point in the molding cycle the preformed shape becomes an integral part of the molded product with no discernible boundary other than color difference. Finally, the rotationally molded product, vessel or object is removed.

The following are a few non-limiting examples of temperatures used in the sintering process or in the melting without curing process of a preformed shape for various types of resins:

Example 1

In the case of a cross-linked resin such as polyethylene, the preformed shape can be sintered from about 125-240 degrees F. The temperature varies depending on surrounding conditions. The temperature should not exceed about 10 degrees above the melting point to prevent curing or cross-linking. The pressure can be 0 to about 3,000 psi. Time is also chosen to meet this criterion.

Example 2

The temperature for sintering other types of resins is chosen to be slightly above the melting point of the resins so long as the individual resin particles begin to bind together without melting all the way through. Pressure can be 0 to about 3,000 psi. Time is also chosen to meet this criterion.

Example 3

The temperature for melting the first resin is also about 10 degrees above the melting point of the first resin for either crosslinkable or linear resins so long as the first resin remains under cured. Temperature and pressure are also chosen to melt the first resin without curing it.

Example 4

For all types of resins, pressure and heat for forming the preformed shape are chosen so that the first resin is always under cured prior to the later rotational molding step.
Multilayered Vessel or Object The process of incorporating a preformed shape in a rotationally molded object or vessel can also be done in a multi-layered object or vessel. FIG. 8 shows a vessel with two layers of resin used to make a side wall 20 and a second side wall 21. The method described above for making a single layered object or vessel shown in FIG. 6 is followed. The thickness of the second resin 14 should match the thickness of the preformed shape 10. Additional layers can then be applied. In an example of a multi-layered fuel tank, the first resin of the preformed shape 10 is translucent, the second resin 14 is opaque, the following $2^{nd}$ layer that makes up the second side wall 21, and any additional layers, etc. are translucent (FIG. 8). In this manner, a clear sight window is provided that permits the viewer to see into the fuel tank through the preformed shape and the second and third layers.

Types of Resins:

As stated above, the first resin can be a polyethylene resin such as linear polyethylene resin, a cross-linkable polyethylene, recycled polyethylene, LLDPE, LDPE, HPPE. Other rotational mold resins include polyvinyl chloride, nylon, polypropylene, thermoplastic polyester elastomers. Other known rotationally moldable resins are also appropriate for the first and second resins. The resins can be any number of colors and can be either opaque or translucent Usually, the first resin and second resins are different colors, textures or have different opaqueness/translucency. The process is also possible with nylon or other rotational molding materials.

Additives:

Additives include colorants, antistatic agents, cross-linking agents, flame retardants, flow modifiers, foaming agents, heat stabilizers, impact modifiers, UV stabilizers, metallic substances, texture substances.

Types of Rotational Molding Machines:

Types of rotational molding machines that are suitable for the method of the invention include rock and roll machine, clamshell machine, vertical or up & over rotational machine, shuttle machine, swing arm machine and carousel machine.

Types of Rotationally Molded Products:

The following is a non-limiting list, of illustrative examples only, of products that can be made by the rotational molding process of the invention: tanks, benches and seats, marine products, fenders, spray carts, housing, coves, displays, bumpers, trash cans, photo props, recreational products, safety equipment, household items and many more.

What is claimed is:

1. A method of incorporating a preformed shape into a rotational molded product, the method comprising: a) forming a first resin into an uncured preformed shape having perimeter edges; b) positioning the uncured preformed shape having perimeter edges against an inside wall of a rotational mold; c) adding a second resin charge into the rotational mold; heating and rotating the rotational mold to form the rotational molded product, wherein said second resin binds to the perimeter edges of the preformed shape and the preformed shape becomes cured along with the second resin.

2. The method of claim 1, wherein during positioning step b), the preformed shape is retained in a desired position against the inside wall of the rotational mold by tabs, metal inserts, threads, magnets, undercuts, glue, tabs or clamps on the wall of the rotational mold.

3. The method of claim 1, wherein the preformed shape is a translucent sight window, the second resin is opaque and the product is a tank for holding gas, water or other fluid.

4. The method of claim 1, wherein the second resin charge is calculated to an amount necessary to adhere and entirely cover an exposed interior surface of the rotational mold.

5. The method of claim 1, wherein the first resin is in the form particles of a powder, micro-pellet or pellet.

6. The method of claim 1, wherein the rotational mold has a metal surface and the second resin is more attracted to the metal surface of the rotational mold than the preformed shape and wherein said second resin builds up on the metal surface when heated and only binds to the perimeter edges of the preformed shape.

7. The method of claim 1, wherein after the step of heating and rotating the rotational mold to form the rotational molded product, adding one or more additional resin layers by rotational molding to cover the preformed shape and second resin.

8. The method of claim 7, wherein the first resin is translucent, the second resin is opaque and the one or more additional resin layers are translucent.

9. The method of claim 1, wherein said first and second resins are rotational mold resins.

10. The method of claim 9, wherein the rotational mold resins are selected from polymer resin, linear polyethylene resin, a cross-linkable polyethylene resin, ethylene vinyl acetate, thermoplastic elastomer, poly lactic acid, acrylic, vinyl, polyester compounds, nylon or composites of various rotationally moldable materials.

11. The method of claim 1, wherein the preformed shape is a sight window, tab, shaped indicia, colored indicia, mounting tab, object with preformed hole, threads, small detailed feature, solid features, object with localized properties.

12. The method of claim 11, wherein when the preformed shape is a sight window, the first resin is translucent when cured.

13. The method of claim 1, wherein the uncured preformed shape is formed by sintering.

14. The method of claim 13, wherein the sintering of the first resin into preformed shape is conducted by pressure sintering, heat sintering and/or laser sintering, and wherein the sintering does not substantially transform the nature of the resin from a powdered, micro-pellet or pellet consistency and the first resin is kept below its curing point or crosslink activation point.

15. The method of claim 13, wherein the preformed shape is sintered onto a carrier.

16. The preformed shape of claim 15, wherein a thermal conductivity of the carrier relative to a thermal conductivity of the rotational mold is chosen so that the first resin and the second resin melt at the same rate during the step of heating the rotational mold.

17. The method of claim 1, wherein the uncured preformed shape is formed by melting the first resin without curing the first resin.

18. The method of claim 17, wherein the first resin is a crosslinkable polymer and crosslinking of the first resin has not occurred.

19. The method of claim 18, wherein peroxide in the crosslinkable polymer has not been thermally activated and crosslink bonds have not formed in the polymer.

20. The method of claim 17, wherein the first resin is a linear polymer and wherein gas bubbles still remain in the preformed shape.

21. The method of claim 17, wherein the preformed shape is formed by rotational molding or hot press and then cut, milled or stamped into a desired size and dimension.

22. A method of incorporating a preformed shape into a rotational molded product, the method comprising: a) sintering to form a first resin into an uncured preformed shape having perimeter edges; b) positioning and retaining the uncured preformed shape having perimeter edges against an inside wall of a rotational mold; c) adding a second resin into the rotational mold; heating and rotating the rotational mold to form the rotational molded product, wherein said second resin binds to the perimeter edges of the preformed shape and the preformed shape becomes cured.

23. The method of claim 22, wherein during the sintering step, heat and force is applied to compress the first resin into a desired preformed shape and thickness.

24. The method of claim 22, wherein the sintering of the first resin into the preformed shape is conducted by heating the polymer above its melting point without completely curing the polymer.

25. A method of incorporating a preformed shape into a rotational molded product, the method comprising: a) melting to form a first resin into an uncured preformed shape having perimeter edges; b) positioning the uncured preformed shape having perimeter edges against an inside wall of a rotational mold; c) adding a second resin into the rotational mold; heating and rotating the rotational mold to form the rotational molded product, wherein said second resin binds to the perimeter edges of the preformed shape and the preformed shape becomes cured.

* * * * *